United States Patent
Tsai et al.

(10) Patent No.: US 9,298,301 B2
(45) Date of Patent: Mar. 29, 2016

(54) POWER MANAGEMENT METHOD FOR HANDHELD MOBILE ELECTRONIC DEVICE AND HANDHELD MOBILE ELECTRONIC DEVICE USING THE SAME

(71) Applicant: HTC Corporation, Taoyuan County (TW)

(72) Inventors: Ting-Ying Tsai, Taoyuan County (TW); Abhishek Saxena, Taoyuan County (TW); Chen-Huang Fan, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 151 days.

(21) Appl. No.: 14/258,039

(22) Filed: Apr. 22, 2014

(65) Prior Publication Data

US 2015/0301664 A1      Oct. 22, 2015

(51) Int. Cl.
*G06F 3/041* (2006.01)

(52) U.S. Cl.
CPC ........ *G06F 3/0412* (2013.01); *G09G 2330/021* (2013.01)

(58) Field of Classification Search
CPC ................. G09G 2360/16; G09G 3/0412
See application file for complete search history.

(56) References Cited

U.S. PATENT DOCUMENTS

| 2012/0162110 A1* | 6/2012 | Kobayashi | G06F 1/1643 345/173 |
| 2015/0009122 A1* | 1/2015 | Chou | G06F 3/02 345/156 |

* cited by examiner

*Primary Examiner* — Gerald Johnson
(74) *Attorney, Agent, or Firm* — Jianq Chyun IP Office (57) ABSTRACT

The present disclosure proposes a power management method for use by a handheld mobile electronic device having a display and a device using the same. The method may include when the display darkens as the result of not receiving input signal after a first predetermined period, the screen brightness would be restored back to the original brightness in response to receiving a sensor output generated by a specific movement of the handheld mobile electronic device. Otherwise, when the touch screen darkens as the result of activating a key of the handheld mobile electronic device, the display will not respond to sensor output generated by the specific movement of the handheld mobile electronic device.

20 Claims, 7 Drawing Sheets

POWER MANAGEMENT METHOD FOR HANDHELD MOBILE ELECTRONIC DEVICE AND HANDHELD MOBILE ELECTRONIC DEVICE USING THE SAME

TECHNICAL FIELD

The present disclosure directs to a power management method for a handheld mobile electronic device and a handheld mobile electronic device using the same method.

RELATED ART

Currently, a handheld mobile electronic device such as a smart phone has become versatile, portable, and increasingly powerful, and thus the smart phone could be considered as one of the most preeminent derivatives of the most recent technological development. Since data processing, personal organizing, multimedia applications, and telephone functions could all be integrated into the handheld mobile electronic device, a portable pocket sized computer, a handheld mobile electronic device such as a smart phone has become more and more like a portable pocket sized computer and a prevailing personal organizer. Furthermore, technological advancements of a handheld mobile electronic device will undoubtedly continue to progress as more and more functions and features which were not traditionally a part of a smart phone would be incorporated as native functions and features of the device.

As handheld mobile electronic devices have become increasingly versatile, power consumption may in turn be less efficient since having more functions and features could means that a device may require more power in order to support these functions and features. Therefore, when a handheld mobile electronic device is not in use by a user, the device would normally turn off certain functions and features automatically in order to reduce unnecessary power drain on the battery of the device. For instance, unlike a desktop computer which is configured to activate a screen saver when it sits idle for a certain period of time, the handheld mobile electronic device would darken its touch screen and eventually turn off the screen for the purpose of preventing unnecessary power drain and would subsequently activate a screen lock feature either before or after the touch screen is turned off in order to prevent inadvertent user inputs on the touch screen. A user may also activate a power button to manually turn on and off the touch screen manually.

Figure 1:
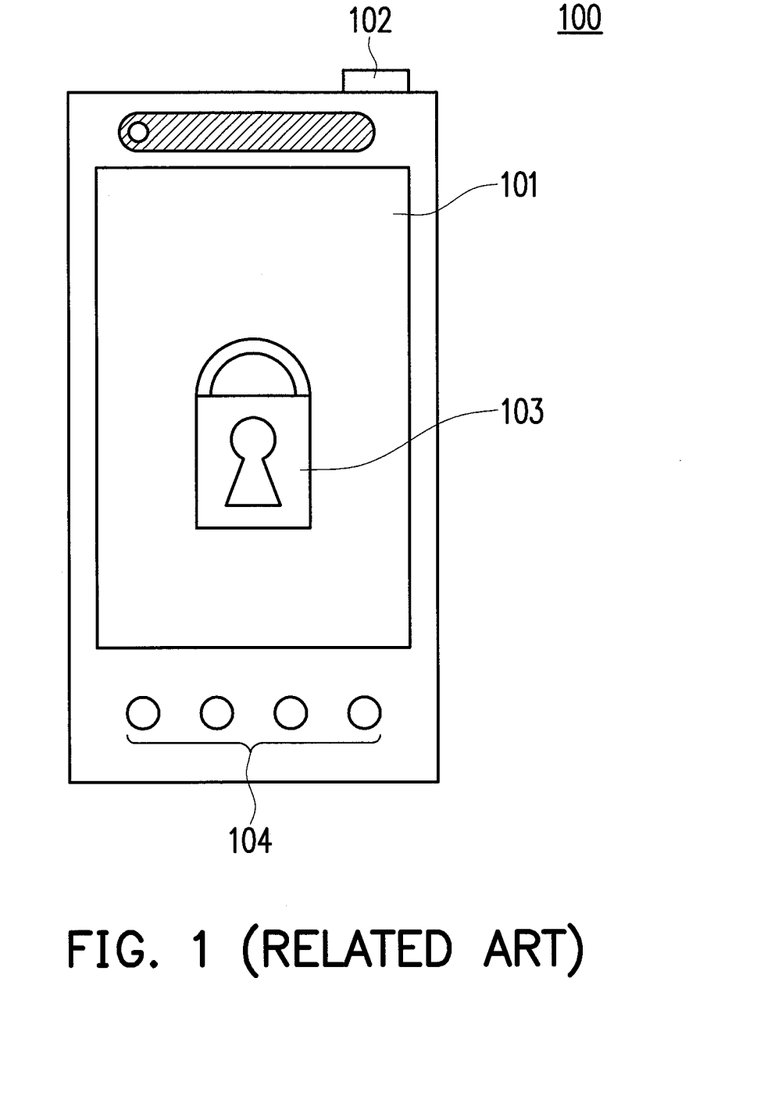
FIG. 1 illustrates a typical handheld mobile electronic device equipped with a power button.

FIG. 1 illustrates a recent handheld mobile electronic device equipped with a power button. The handheld mobile electronic device in this example would be a smart phone, but other types of handheld mobile electronic devices such as a tablet and a PDA also possess similar features. Relevant features of the exemplary smart phone 100 of FIG. 1 would include a touch screen 101, a power button 102, and one or more input buttons 104. The touch screen 101 would typically have a screen lock 103 feature. In one of the current implementations, a user may turn off the smart phone 100 completely by pushing the power button 102 with a long hold (e.g. 2 second hold). If a user simply wants to bring the smart phone 100 into a power saving mode which is also known as a sleep mode, the user would push the power button 102 without applying the long hold. In the reduced power mode, certain functions and features of the smart phone 100 would either be disabled or would operate in a reduced state. For example, the smart phone 100 may turn off some sensors, darken or turn off the touch screen 101, and turn off some input buttons. However, a user may still receive phone calls or listen to music currently being played by the smart phone 100. When a user wants to come out of the reduced power mode, the user would first need to push the power button 102 and then entering an unlocking sequence on the touch screen 101 to deactivate the screen lock 103. The unlock sequence may include performing a set of predetermined hand gestures and entering a password.

However as more and more functions and features which were not traditionally a part of a smart phone were incorporated into the smart phone, the handling of the power saving mode and the screen lock feature in conventional smart phones has become increasing inadequate. Referring back to FIG. 1 as an example, suppose that a user chooses to watch a movie using one's smart phone 100 which is without any added complexity with regard to its power saving and screen lock features, the touch screen 101 may keep turning off and requiring its user to keep turning on the screen after every short period of time. To make matters worse, suppose that a user wants to turn the touch screen 101 back on to the watch the movie, the user would not only need to push the power button 102 to turn the touch screen 101 back on, but also the user would need to deal with the lock screen by performing a set of specific hand gestures. Even though the screen lock was intended to safeguard the touch screen from inadvertent touches, under this particular circumstance the screen lock would seem completely unnecessary. Furthermore, suppose that the user has enacted a password to safeguard the device from unauthorized uses, the user would also need to enter the password before one could gain access to the main user interface of the home screen of one's device. All of these power saving and safeguarding sequences is not only unnecessary during some circumstances but is also quite tedious and inconvenient for its user.

Therefore, the present disclosure proposes a power management method which would achieve similar degrees of power saving and touch screen safeguarding but would minimize hindrances for uninterrupted uses.

SUMMARY OF THE DISCLOSURE

Accordingly, the present disclosure proposes a power management method to be used by a handheld mobile electronic device and a handheld mobile electronic device using the same method.

Specifically, the steps of the proposed method would include at least but not limited to adjusting the touch screen of the handheld mobile electronic device from a first brightness to a second brightness which is less than the first brightness in response to no touch signal being received by the touch screen after a first predetermined period. The second brightness of the touch screen would eventually be restored back to the first brightness in response to receiving a sensor output which would be generated by a specific movement of the handheld mobile electronic device. The touch screen could be adjusted to a second brightness in response to activating a first key of the handheld mobile electronic device. While in the second brightness, the touch screen would be kept in the second brightness even in response to the specific movement of the handheld mobile electronic device as no sensor output would be received to restore the touch screen from the second brightness back to the first brightness. In that case, the first touch screen brightness would be restored in response to activating the first key of the handheld mobile electronic device.

In one of the exemplary embodiments, the handheld mobile electronic device would include a proximity sensor which would be activated to detect a nearby object in response to no touch signal being received by the touch screen after a second predetermined period. The second predetermined period would be slightly less than the first predetermined period. In response to the nearby object being detected and no touch signal being received by the touch screen after the first predetermined period, the touch screen would be adjusted to the second brightness. Also the touch screen would be kept at the second brightness until the first key of the handheld mobile electronic device is activated.

In one of the exemplary embodiments, before the touch screen is darkened from the first brightness to the second brightness in response to no touch signal being received by the touch screen after the first predetermined period, a particular application would have already been activated, and the application would provide a user interface through the touch screen. Also the aforementioned sensor could be a G-sensor and would be registered to this application.

In one of the exemplary embodiments, restoring the touch screen from the second brightness back to the first brightness would involve restoring on the touch screen the user interface of the application which was displayed before the screen was darkened because of expiration of the first predetermined period. Also the restoring of the user interface would be accomplished without going through a screen lock deactivating procedure.

In one of the exemplary embodiments, the touch screen could be adjusted from the second brightness back to the first brightness in response to the application receiving a trigger signal from the G-sensor, wherein the trigger signal could be an interrupt generated by the G-sensor in response to detecting the specific movement of the handheld mobile electronic device.

In one of the exemplary embodiments, when the sensor output is trigger by the specific movement, the profile of the specific movement would include a slight variation toward any direction in the horizontal plane, but the specific movement would not involve any vertical vector component which would be ignored by the G-sensor.

In one of the exemplary embodiments, during a telephone conversation, the sensor output would be triggered by the specific movement to restore touch screen brightness, and the specific movement would include a non-zero vertical vector component, but the G-Gensor would ignore vector components toward any direction in the horizontal plane.

In one of the exemplary embodiments, the first key is the same power key which is used to turn on or off the handheld mobile electronic device. When the first key is used to turn off the handheld mobile electronic device, said G-sensor which was previously registered to said application would be dissociated with the application.

In one of the exemplary embodiments, wherein the first predetermined period is less than 40 seconds, and second predetermined period is less than 38 seconds.

In one of the exemplary embodiments, the handheld mobile electronic device would possess an infrared modulator and an infrared transmitter and could be configured as a remote control to transmit a modulated infrared signal to control a target device.

The present disclosure also proposes a handheld mobile electronic device which includes at least but not limited to a first key, a sensor for generating an output in response to specific movement of the handheld mobile electronic device, a touch screen for receiving a touch signal, a processor electrically coupled to the first key, the sensor, and the touch screen, and the processor would be configured for executing the aforementioned method including adjusting the touch screen from a first brightness to a second brightness which is less than the first brightness in response to no touch signal being received by the touch screen after a first predetermined period, restoring the touch screen from the second brightness back to the first brightness in response to receiving a sensor output generated by the specific movement of the handheld mobile electronic device, adjusting the touch screen to a second brightness in response to activating the first key of the handheld mobile electronic device, keeping the touch screen in the second brightness regardless of any movement of the handheld mobile electronic device, and restoring the touch screen from the second brightness back to the first brightness in response to activating the first key of the handheld mobile electronic device.

The present disclosure also includes a non-transitory storage medium containing computer readable codes which could be read by a processor of a handheld mobile electronic device to execute functions including adjusting the touch screen from a first brightness to a second brightness which is less than the first brightness in response to no touch signal being received by the touch screen after a first predetermined period, restoring the touch screen from the second brightness back to the first brightness in response to receiving a sensor output generated by the specific movement of the handheld mobile electronic device, adjusting the touch screen to a second brightness in response to activating the first key of the handheld mobile electronic device, keeping the touch screen in the second brightness regardless of any movement of the handheld mobile electronic device, and restoring the touch screen from the second brightness back to the first brightness in response to activating the first key of the handheld mobile electronic device.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

The present disclosure proposes a power management method to be used by a handheld mobile electronic device. When a handheld mobile electronic device using the present disclosure lulls into a power saving mode, the device would quickly be restore back to the full power mode and/or the pristine state which is right before the device lulls into the power saving mode in direct response to a trigger signal generated by an onboard sensor which detects for a specific movement of the device. In other words, with the assistance of the onboard sensor, the device would not only come out of the power saving mode quickly but also would restore the user interface which was displayed on the touch screen before the device went into the power saving mode in the first place without going through the trouble of performing screen unlock gestures and entering passwords. Also, by directly utilizing the onboard sensor's interrupt generated in response to specific movement, power consumption could be drastically reduced. Furthermore, power consumption could be reduced based on the steps to dissociate the onboard sensor from the application having said user interface during circumstances when receiving interrupts from the onboard sensor is no longer deemed necessary.

Figure 2:
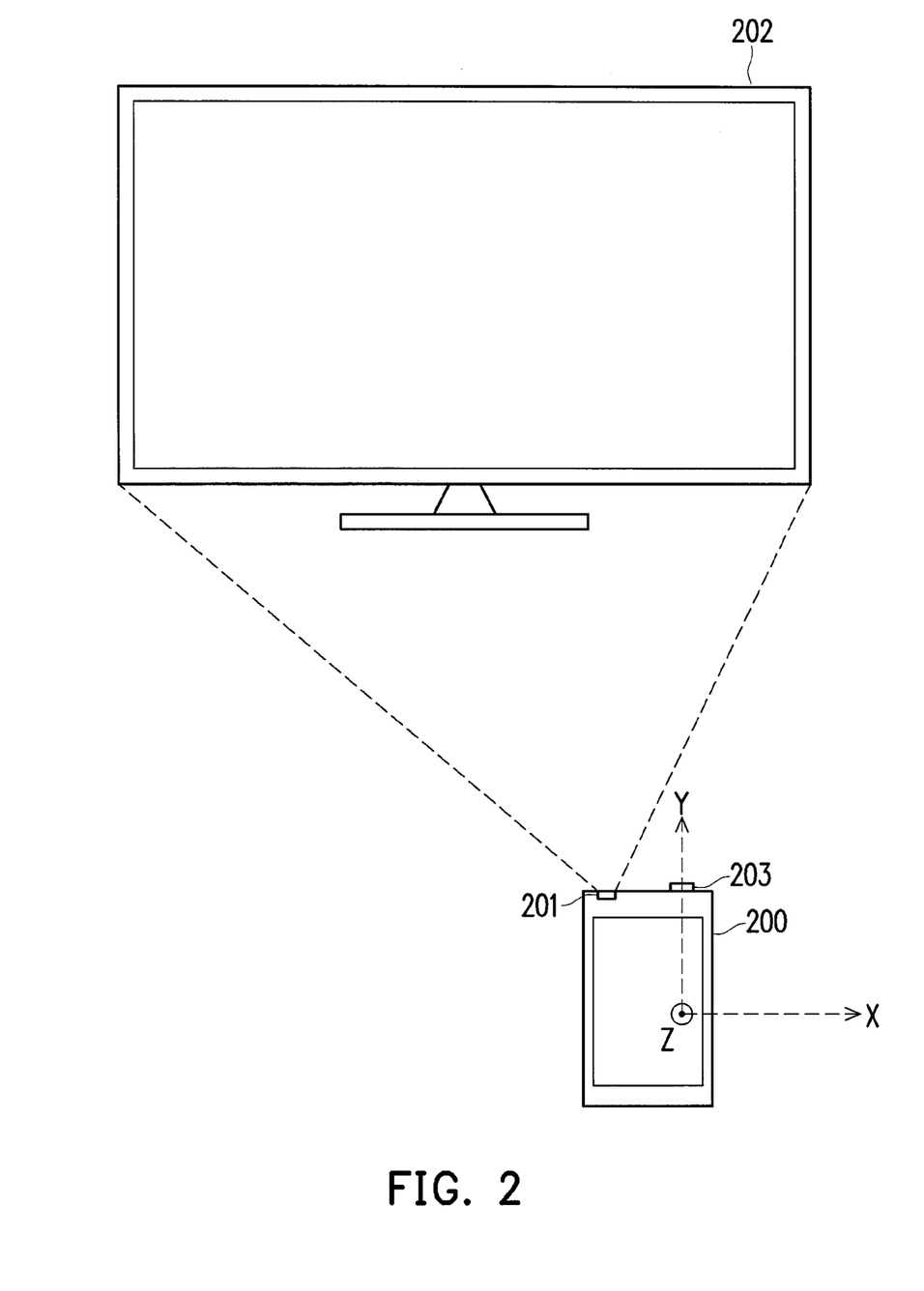
FIG. 2 is a conceptual illustration of the proposed power management method in accordance with one of the exemplary embodiments of the present disclosure.

Before explaining in greater details, please refer to the conceptual illustration of FIG. 2 which explains concepts of the proposed power management method in accordance with one of the exemplary embodiments of the present disclosure. The exemplary scenario of FIG. 2 assumes that the handheld mobile electronic device 200 disposed with an infrared transmitter 201 would be used just like a remote control to wirelessly control a target device 202 such as a television from a distance. First a user may activate a remote control computer program which would a software application having a user interface used to control a remote control hardware disposed in one's device 200. By using the exemplary device 200, a user may first select a representative icon in the home screen of one's device to activate the remote control application through the touch screen, or a person may activate the remote control application through the menu list as the present disclosure is not limited by said activation method herein. Also, it would apparent for one skilled in the art that the present disclosure could be applied to others applications besides the remote control application, such as a phone application. Upon activating the remote application, a remote control user interface would be displayed on the touch screen in order to receive input touch signals from the user for the purpose of controlling the remote device 202. However, the user may also switch to other applications to perform other functions such as making a phone call.

Assuming that a user would stop using the device 200 and subsequently places the device 200 on a surface such as a coffee table, in absence of any user input including touch input and/or input generated as the result of activating any external hardware keys except for the power button 203, the device 200 would be considered to be idle by a processor of the device. After a predetermined period of idleness, the device 200 would eventually transition into a power saving mode which may involve one or more or a combination of darkening and/or turning off of the touch screen, deactivation of a user input, deactivation of a software applications, reduction or deactivation of a hardware activities, and so forth. If the device transitions into the power saving mode because of idleness, then on board sensor would be utilized to detect a specific movement of the device 200. When the device 200 undergoes the specific movement while the device 200 in the power saving mode, then the device 200 would revert back to the state right before the device 200 transitions into the power saving mode (i.e. the normal mode). In other words, suppose that the specific movement involves picking up (e.g. shaking) the device 200, and a user grabs the device 200 and causes it to shake in a way that is similar to the predefined specific movement, then the device would restore what was being displayed on the touch screen of the device 200 just like the way it was before the device 200 lulls into the power saving mode.

For example, if a remote control interface was displayed before the device 200 enters a power saving mode, but after the device 200 sits idle for a predetermined period, the screen of the device 200 would darken and eventually turn off. But then after the specific movement has been detected, the device 200 would transition to once again display the remote control interface before the device 200 went into the power saving mode. Furthermore, the remote control interface would be restore in such a way that a use would not have to perform gestures to unlock the screen or to perform a login processing by entering passwords as the restoration process would be automatic. The advantage of such is that suppose that the screen of the device 200 being used as a remote control blacks out after the device sits idle for a predetermined period, all the user needs to do is to pick up the device to be able to use the device 200 as a remote control. Image just how tedious it would be if a user has to unlock the screen and enters a password every time the user wants to change the channel.

However, if a user activates a specific key such as a power button 203 before the device 200 times out and enters the power saving mode, the device 200 would not come out of the power saving mode and subsequently revert back to the normal mode in response to the specific movement underwent by the device 200 as activating the specific button (e.g. the power button) would signify an intention that the user would really want to turn off the normal mode of device 200. In that case, no movement of the device 200 would cause the on board sensor to transmit a trigger signal to cause the device 200 to come out of the power saving mode. A user would need to activate the specific key once again to revert back to the normal mode. In that case, the user would need to perform screen unlock gesture and/or entering a password in order to gain access to the same user interface as before the device 200 transitioned into the power saving mode. Also whenever the device 200 times out and reverts back to the normal mode after experiencing a specific movement, the activation of the specific key would transition the device 200 into the power saving mode, and in that case said onboard sensor of the device 200 would not trigger the device 200 to revert back to the normal mode.

In order to make the design more robust, the present disclosure may use proximity detection to detect whether the device 200 has been surrounded by an enclosure or by a partial enclosure. This could occur when the device 200 has been put inside a pocket or a bag (i.e. the device 200 is in a pocket mode). When proximity detection has determined that the device 200 has been placed inside an enclosure, it would signify that a user would want to store the device 200 away. In that case, even when the device 200 has been timed out without a user activating the specific key, onboard sensor of the device 200 would not trigger the device 200 to revert back to the normal mode regardless of any movement experienced by the device 200 since the onboard sensor would be disengaged from the application which governs whether to revert the device 200 back to the normal mode or not.

Figure 3:
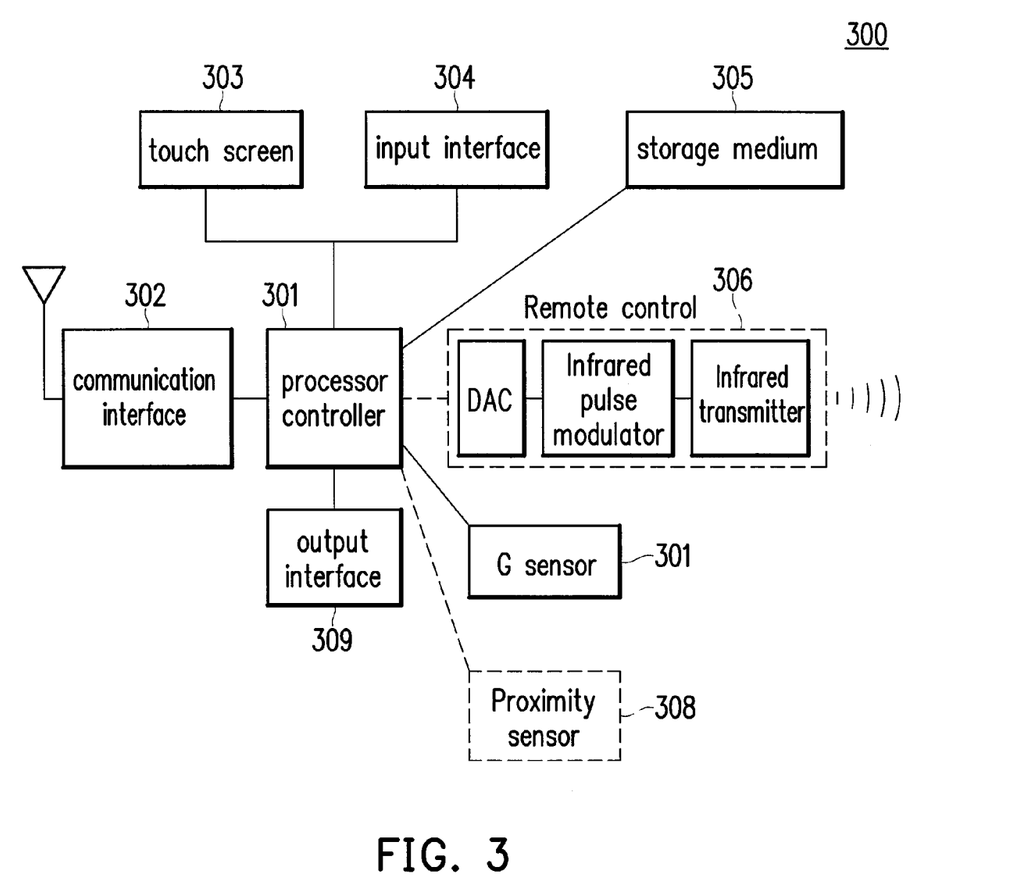
FIG. 3 illustrates an exemplary handheld mobile electronic device in terms of a functional block diagram.

FIG. 3 illustrates an exemplary handheld mobile electronic device such as the device 200 used in the scenario of FIG. 2 in terms of a functional block diagram. An exemplary mobile electronic device could be a smart phone, a mobile phone, a person digital assistant (PDA), a tablet, a notebook computer, and so forth. The exemplary mobile electronic device of FIG. 3 would include a processor and controller circuit 301. The processor and controller circuit 301 would be electrically coupled to at least but not limited to a communication interface 302, a touch screen 303, an input unit 304, a storage medium 305, a G-sensor 307, an output interface 309. The processor and controller circuit could also optionally be electrically coupled to a remote control unit 306 and a proximity sensor 308.

The processor and controller circuit 101 may include a micro-controller, a North Bridge, a South Bridge, a field programmable array (FPGA), a programmable logic device (PLD), an application specific integrated circuit (ASIC), or other similar device, or a combination thereof. The processor and controller circuit 101 may also include a central processing unit (CPU) or a programmable general purpose or special purpose microprocessor, a digital signal processor (DSP), a graphics processing unit (GPU), an application specific integrated circuit (ASIC), a programmable logic device (PLD), or other similar device or a combination thereof, which is used for processing all tasks of the exemplary mobile electronic device and would execute functions related to the proposed method of the present disclosure.

The communication interface circuit 302 could include components such as a protocol unit which support signal transmissions of a global system for mobile communication (GSM), a personal handy-phone system (PHS), a code division multiple access (CDMA) system, a wireless fidelity (Wi-Fi) system or a worldwide interoperability for microwave access (WiMAX). The communication interface circuit 102 would also provide wireless access for the device 300 by including components at least but not limited to a transmitter circuit and a receiver circuit.

The touch screen 303 may contain a display such as a liquid crystal display (LCD), a light-emitting diode (LED) display, a field emission display (FED) or other types of display.

The input interface 304 could be, for example, an input device such as a mouse, a keyboard, a joystick, a wheel, and so forth and would receive an input operation from a user. The input interface 304 may also include a resistive, a capacitive or other types of touch sensing device which would be integrated as a part of the touch screen 303. The input interface would also include a power key (e.g. 102 203). When a user activates the power key 102 by applying a short press, the device 300 would transition into a power saving mode. When a user applies a long press on the power key 102 for more than, for example, two seconds, the device 300 would turn off entirely.

The storage medium 305 could volatile or permanent memories which would store buffered or permanent data such as compiled programming codes used to execute functions of the exemplary mobile electronic device.

The remote control unit 306 would be used to wirelessly control a target device at a distance and would include at least but not limited to a digital to analog converter, a infrared pulse modulator, and an infrared light transmitter. Alternatively, the remote control unit 306 may also be a BT remote control, a ZigBee remote control, or other types of remote control which uses short distance communication technologies. When the processor 301 or an independent processor transmits a control command to a target device, the control command would be converted into an analog signal which would then be modulated and transmitted as a modulated infrared pulse used to control a target device.

The G-sensor 307 would be a type of accelerometer for detecting acceleration and outputting acceleration measurement having X, Y, and Z vector components. The G-sensor would also have an interrupt mode and could transmit an interrupt based on a particular condition. The proximity sensor 308 detects nearby objects without physical contacts by transmitting electromagnetic field and detecting a change of pattern in the field. The output interface 309 would include at least but not limited to a speaker, a vibrating oscillator, and one or more light emitting diodes (LED).

Figure 4:
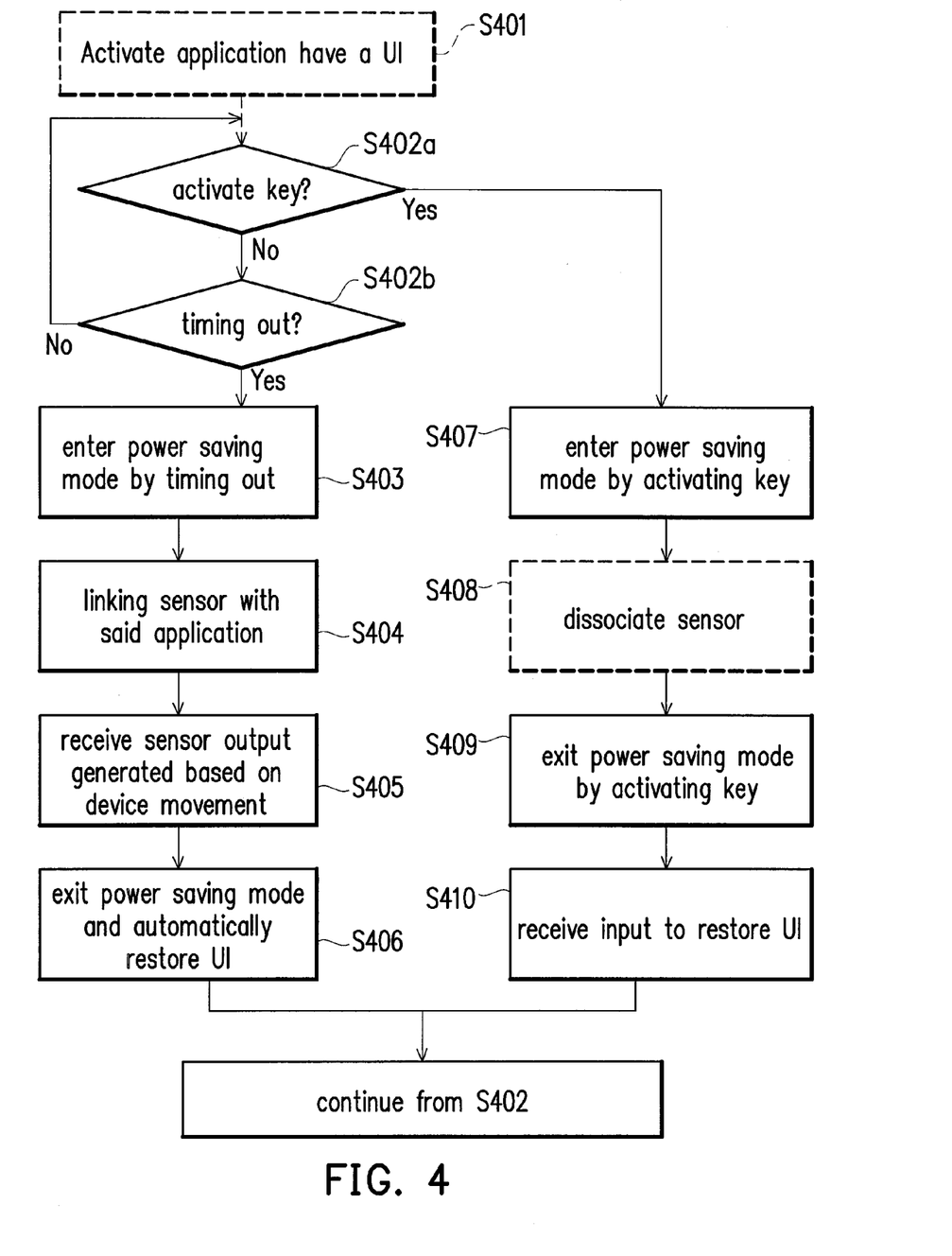
FIG. 4 is a flow chart which illustrates the power management method in accordance with one of the exemplary embodiments of the present disclosure.

FIG. 4 is a flow chart which illustrates the power management method applicable for a handheld mobile electronic device such as the one in FIG. 3 in accordance with one of the exemplary embodiments of the present disclosure. In the optional step S401, the device 300 would receive a touch signal which would activate an application. An application could be activated, for example, by applying a touch action on a representative icon of an application (e.g. map, music player, calendar, and etc. . . . ). The application would have a user interface to receive touch actions from a user to control the application. A timer (not shown) would be utilized by the processor 301 to count the idle period of the device 300. According to one of the exemplary embodiments, the idle period would be counted from the time when the touch screen 303 no longer receives any touch input. According to another one of the exemplary embodiments, the idle period would be counted from the time when the touch screen 303 and the input interface 304 no longer receives any user input. While the timer is counting the period of inactivity, three possibilities could occur next. One possibility would be that a user would use the touch screen 303 and/or the input interface 304, and in that case the timer would be reset. A second possibility would be to allow the touch screen to sit idle and to time out; in that case, step S403 would be executed. A third possibility would be to press a predefined key such as a power button (e.g. 102, 203) to enter step S407.

In step S402a, the processor 301 would determine whether the power button (e.g. 102, 203) has been pressed. If yes, step S407 would be executed, but if no, step S402b would be executed. In step S402b, the processor 301 would determine whether the timer has timed out. If yes, step S403 would be executed, but if no, that means user activities have caused the timer to reset and the process would loop back to step S402a. In step S403, after the handheld mobile electronic device 300 sits idle for a first predetermined period of time which could be 30~40 seconds, the device 300 would enter a first power saving mode. In one of the exemplary embodiments, for the first power saving mode, in addition to performing power saving measures, the device 300 would also first darken its screen first (i.e. the screen is just slightly on) for a second predetermined period such as 10~15 seconds. While the touch screen 303 has been darkened to reduce power consumption, a user might still dimly see the content of the touch screen 303 on which instructions to return to the normal mode could be provided (i.e. return to normal mode by performing a specific movement with the device 300). Normal mode here would mean that the touch screen 303 would be re-lit back to the same intensity as when steps S401~S402 would be performed, and said user interface would be restored and displayed exactly as it was in steps S401~S402 (i.e. right before the device 300 first enters the power saving mode), and functions would be performed in the same operational capacity as right before the device 300 first enters the power saving mode. When the second predetermined period has expired and the device 300 still sits idle, the device 300 would turn off the touch screen 303. In one of the exemplary embodiments, for the first power saving mode, the device 300 would turn off the touch screen 303 immediately after the device 303 sits idle for a first predetermined period.

In step S404, after entering the first power saving mode, a sensor would be linked or associated with the application such as the remote control application. Said sensor would be a sensor which measures movements of the device 300 and could be a G-sensor 307 for example. However, it would be apparent that one skilled in the art could substitute the G-sensor with any other types of sensor as long as the sensor would accurately measure the movement of the device 300. Linking or associating a sensor with an application could mean that the sensor is registered in the registry of the operation system to allow an application to have access to the sensor through an application programming interface (API). Otherwise the application would not be able to have access to the output of the G-sensor.

In step S405, the processor 301 would receive sensor output generated based on specific device movement. In other words, if an external force moves the device 300 to generate a specific movement, and the specific movement is determined to match a specific profile, then the sensor would generate an output based on the device movement. In one of the exemplary embodiment, the sensor would generate an output to the application only based on the specific device movement (i.e. the sensor could generate outputs in response to changes to different target locations but would not generate an output to the application except that when the specific device movement has been detected by the sensor would the sensor generate the output to the application). This means that the device movement would be determined locally by the sensor, and then when the device movement matches a specific device movement profile, the sensor would transmit a trigger signal to the application. This differs from convention methods which would typically output the sensor readings to the processor 301 in which the specific movement would be determined. This however would require the analog sensor output to be converted into digital signals first before feeding it the main processor 301. In the conventional way, the overall power consumption would be in the order of milliamps as the device 300 would not be able to actually enter the first power saving mode or any sleep mode; whereas the proposed method would only require the overall power consumption around 200 micro amps. Alternatively, in one of the exemplary embodiments, a low power independent micro controller could be used to process sensor readings in order to determine whether device movements match a specific device movement profile. By doing such, more complex determination could be performed.

In step S406, upon receiving an output trigger signal from the sensor after the device movement matches the specific movement profile, the first power saving mode would be exited, and the normal mode would be reverted. The normal mode would be reverted in the manner such that not only the touch screen would be turned on but also the user interface of the application would be restored and displayed just the way it was right before the device 300 enters the first power saving mode in the first place. Also all of this would be accomplished without having a user to perform screen unlock gestures and enter passwords. When the normal mode has been reverted, the procedure may continue from step S402.

If step S407 is performed instead, the device 300 would enter a second power saving mode upon receiving a key input of a predefined key which for example could be the same power key used to turn on and off the device 300 as previously mentioned. In the second power saving mode, the processor 301 would perform power saving measures but the touch screen 303 would be turned off right away. In step S408, the sensor used to determine device movement would be dissociated from the application if step S404 had been performed previously. In this way, regardless of whether there is a specific movement imposed on the device 300, the second power saving mode would not be exited until in step S409 when said predefined key has been activated. In step S410, the touch screen 303 would require user input such as performing the screen unlock procedure and entering a password before the user interface of the application could be restored, and then the procedure could continue from step S402.

Figure 5A:
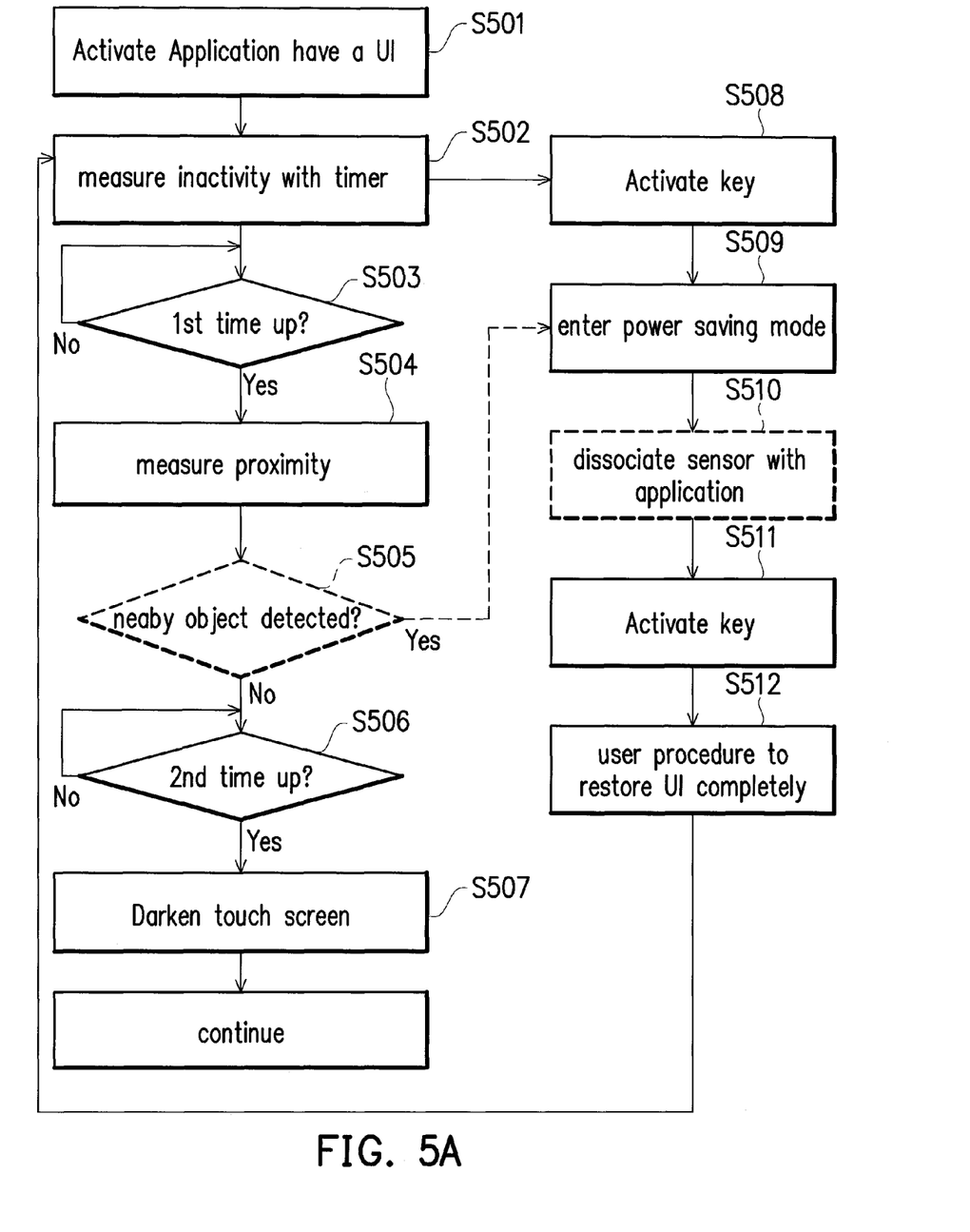
FIG. 5A is a flow chart which illustrates the power management method in accordance with one of the exemplary embodiments of the present disclosure.

FIG. 5A is a flow chart which illustrates the power management method with further detail in accordance with one of the exemplary embodiments of the present disclosure. In step S501, the device 300 through the processor 301 would activate an application. For exemplary purposes, the application would be assumed to be a remote control application which could be activated via a touch action on a representative icon or from a menu list. The remote control application would have a remote control interface through which a user may access the remote control hardware 306 to control a remote target device (e.g. 202). In step S502, assuming that a user is not using the device 300, a timer within the device 300 would be utilized by the processor 301 to determine the idle period of the device 300. There could be two ways for the device 300 to enter a power saving mode. One would be the device timing out, and step S503 would be executed, and the other would be to activate a power key, and step S509 would be executed. If a use activates a power key before the device 300 times out in step S508, then the procedure progresses to step S509. Steps S509~S512 would be very similar to steps S407~S410 so that the description for these steps will not be repeated.

In order to make the proposed method more robust, steps S503~S505 involve the use of a proximity sensor 308 to determine whether a user has placed the device 300 into a pocket or a bag right before the device 300 times out and enter the first power saving mode. The proximity sensor 308 could be turned on 1~2 seconds before the timer reaches a third predetermined period (i.e. timing out). In step S503, the processor 301 through the use of a timer would determine whether the second predetermined period has been reached (i.e. $1^{st}$ time up in FIG. 5A). If the third predetermined period for exemplary purposes would be 30 seconds, the second predetermined period could be 28 or 29 seconds. Therefore, in step S503, if the device 300 has sat idle for 28 or 29 seconds, the device 300 in step S504 could turn on the proximity sensor 308 to determine whether the device 300 is enclosed by nearby object(s). If yes, then it could be assumed that the user intention here is to store the device away and the procedure could proceed from step S509. If device 300 is not enclosed by nearby object(s), and in step S506 when the third predetermined period (e.g. 30 seconds) has been reached (i.e. $2^{nd}$ time up in FIG. 5A), then in step S507, the processor 301 would control the touch screen 303 to be darkened and transition to the first power saving mode and perform steps S514~S516.

Figure 5B:
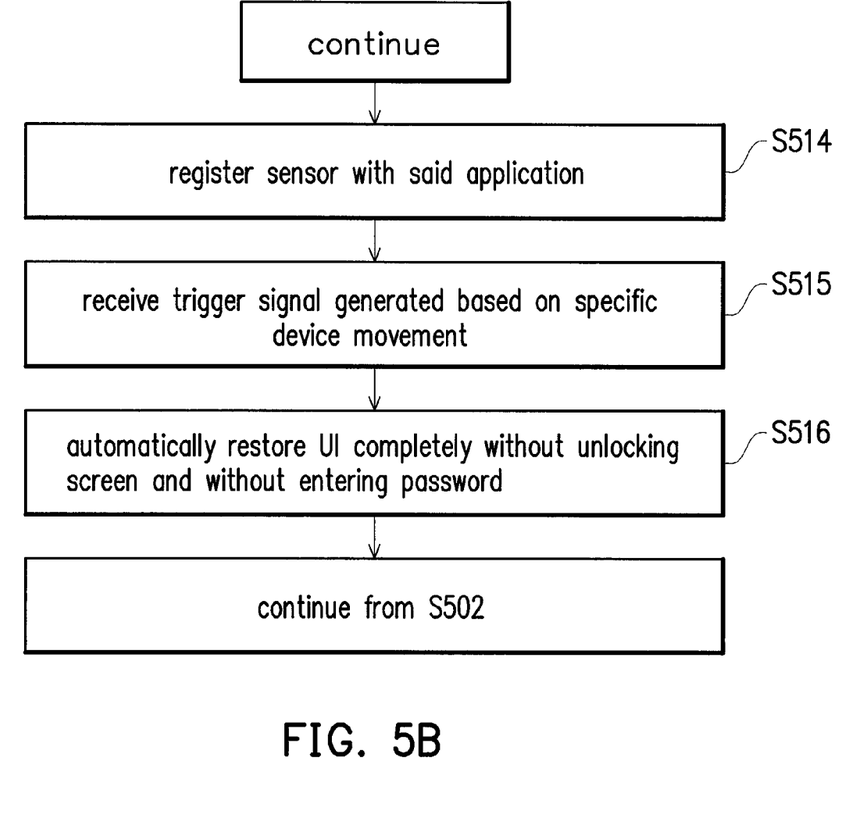
FIG. 5B is illustrates a continuation of FIG. 5A in accordance with one of the exemplary embodiments of the present disclosure.

FIG. 5B is illustrates a continuation of FIG. 5A in accordance with one of the exemplary embodiments of the present disclosure. Step S514 would be very similar to step S404 and the description will not be repeated. In step S514, the processor 301 or the application could receive from the sensor a trigger signal generated by on the specific movement of the device 300. For this example, the sensor would be a G-sensor 307, and the trigger signal could be an interrupt generated by the G-sensor 307 which has an interrupt mode. The driver of the G-sensor 307 could be configured to detect the specific movement, and an interrupt could be generated in direct response to the movement of the device 300 matching a specific device movement profile.

The specific device movement could be application specific. For example, assuming that the remote control application is currently being used, one specific device movement has been determined to optimal when the G-sensor 307 readings in the X or Y direction (e.g. horizontal direction plane based on the coordinate system of FIG. 2) exceeds a small non-zero threshold, but the Z direction (vertical or parallel to the direction of gravity) reading would be ignored in order to lower the sensitivity of the specific movement. Therefore, if a user was using the remote control application and then the device 300 times out because idleness, the user would need to make a very slight movement in the X or Y direction to revert back to normal mode so as to restore the UI of the remote control application.

For another example, assuming that a phone call has been reached and then a phone application has been activated, one specific device movement has been determined to be optimal when the Z direction exceeds a non-zero threshold, but G-sensor 307 readings in the X direction and in the Y direction would both be ignored. Therefore in step S514, when the device 300 has been determined to match the specific movement based on the G-sensor 307 readings, the G-sensor 307 would transmit an interrupt to the processor 301, and the interrupt would be used to trigger the step S515. Steps S515~S516 would be very similar to steps S405~S406 so that a description of step S515 will not be repeated.

In another specific embodiment, a user could be trained to apply a specific movement to revert back to the normal mode and execute step S515. For example, similar to step S403 when the touch screen 303 is first darkened and enters the first power saving mode, an instruction could be displayed to inform the user to execute a specific movement to execute step S515. The specific direction could be for the user to rotate the device first clockwise and then counterclockwise or vice versa. This would mean that positive X and Y reading would need to be detected first to be followed by negative X and Y reading and vice versa in an alternating fashion. Also, the specific movement could be a quick shaking type of movement for which a positive X or Y direction reading would need to be quickly followed by a negative X or Y direction reading in an alternating fashion with each positive or negative direction movement executed in less than a short period of time (e.g. 0.5 second) in order to trigger step S515 to be executed.

Figure 6:
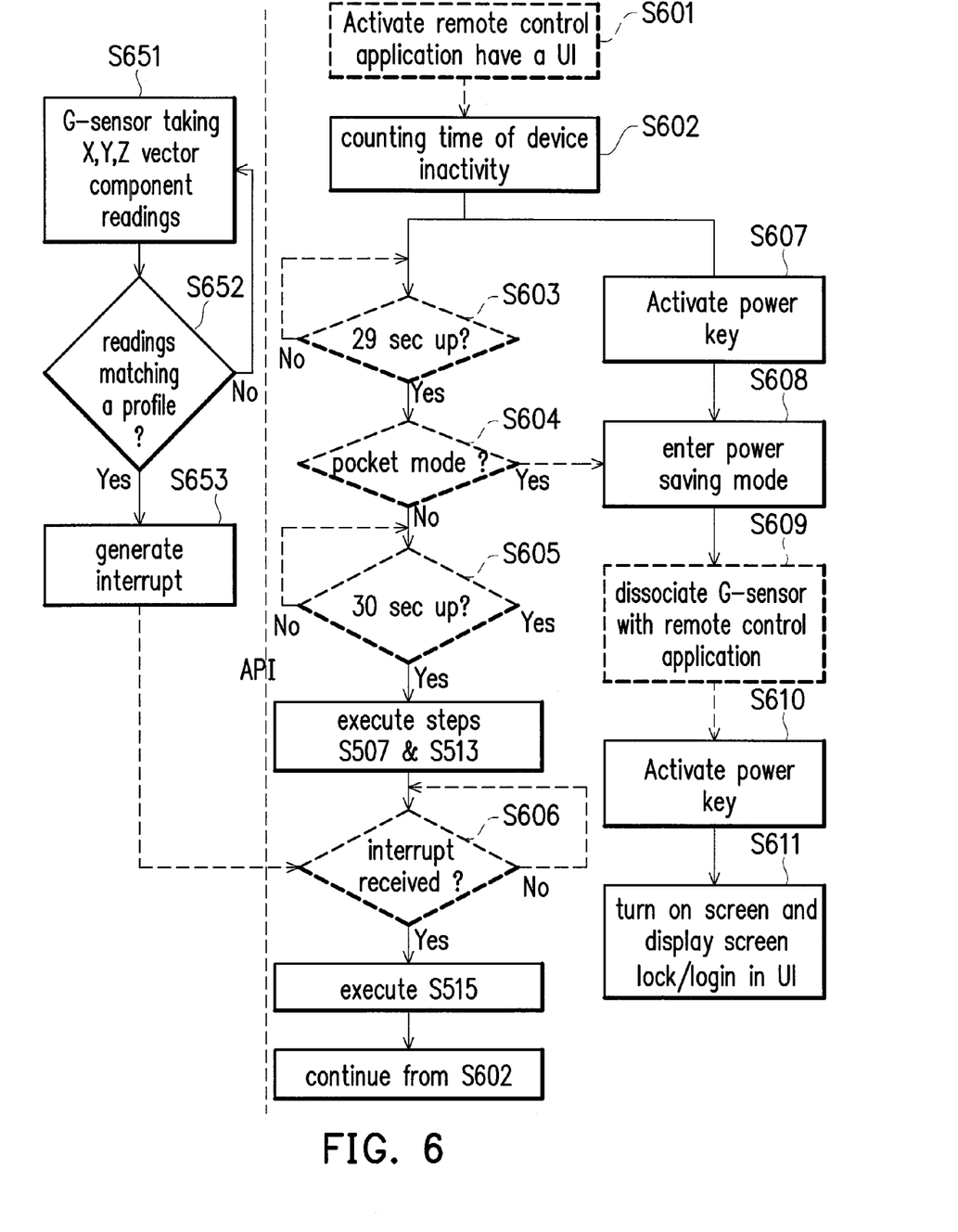
FIG. 6 is a flow chart which illustrates applying the power management method specifically for a remote control application in accordance with one of the exemplary embodiments of the present disclosure.

FIG. 6 is a flow chart which illustrates applying the power management method specifically for a remote control application in accordance with one of the exemplary embodiments of the present disclosure. FIG. 6 is a comprehensive flow chart including various concepts of FIG. 4 and FIG. 5. In step S601, the remote control application with a remote control UI would be activated. In step S602a, the processor 301 would determine whether the power button (e.g. 102, 203) has been pressed. If yes, step S607 would be executed, but if no, step S602b would be executed. In step S602b, the processor 301 would determine whether the timer has timed out. If yes, step S603 would be executed, but if no, that means user activities have caused the timer to reset and the process would loop back to step S602a.

In step S603, when the time of inactivity reaches 29 seconds, the proximity sensor would be activated and would detect for nearby object(s). If nearby object(s) approximate to the device 300 has been detected, the device 300 would enter a pocket mode in which the device 300 would be assumed to be in a pocket and would not be turned on unless a user activates the power key, and the process would progress to step S608.

If the device 300 is not in the pocket mode, then the device would execute steps similar to S507 and S513. Meanwhile, the G-sensor would be registered to the remote control application, and in step S651 the G-sensor would take X, Y, and Z vector component readings. In step S652, the G-sensor would locally determine whether the X, Y, Z vector component readings match a specific movement profile. When the device 300 has been deemed to move according to the specific movement, then in step S653 an interrupt would be generated; otherwise the G-sensor would continue to take X, Y, Z vector component readings. When an interrupt has been generated, the interrupt signal would be received by the processor in step S606, and then step S515 would be executed, and the procedure would continue in step S602.

If a user had activated the power key in step S607, the device would enter the second power saving mode in step S608 in which the screen would be turned off by the processor 301 right away. In step S609 the G-sensor would be dissociated or unregistered from the remote control application so that the application or the processor would no longer receive the interrupt until in step S610 the user activates the power key once again. In step S611, the user may restore the user interface of the remote control application by performing screen unlock procedures and/or entering a password.

In one of the exemplary embodiment which is alternative to step S609, when the processor 301 has determined that no other application would have a need for the G-sensor, the processor 301 may deactivate the G-sensor in step S609 before reactivating the G-sensor in step S610.

In view of the aforementioned descriptions, the present disclosure would be used by a handheld mobile electronic device and is able to quickly restore the user interface of a handheld mobile electronic device from a power saving mode back to the state which was right before the handheld mobile electronic device went into the power saving mode in the first place without going through the trouble of unlocking screens and performing a login process. Also, the present disclosure would reduce power consumption based on the detection of interrupts from the onboard sensor and steps to dissociate the onboard sensor from the application having said user interface during circumstances when receiving interrupts from the onboard sensor is no longer deemed necessary.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

In all the drawings of the present disclosure, a box enclosed by dotted lines would mean an optional functional element or an optional step, and a dotted line may mean that the process flow could be optional or may not necessarily occur.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A power management method for use by a handheld mobile electronic device comprising a display having a first brightness, and the method comprising:
adjusting the display from having the first brightness to a second brightness which is less than the first brightness in response to no input signal being received by the display after a first predetermined period;
restoring the display from the second brightness back to the first brightness in response to receiving a sensor output generated by a movement of the handheld mobile electronic device;
adjusting the display to the second brightness in response to a first activation of a first key of the handheld mobile electronic device;
keeping the display in the second brightness regardless of any movement of the handheld mobile electronic device in response to the first activation of the first key; and
restoring the display from the second brightness back to the first brightness in response to a second activation of the first key of the handheld mobile electronic device, wherein the second activation of the first key is subsequent to the first activation of the first key.

2. The method of claim 1 further comprising:
activating a proximity sensor to detect a nearby object in response to no input signal being received by the display after a second predetermined period which is less than the first predetermined period;
in response to the nearby object being detected and no input signal being received by the display after the first predetermined period, adjusting the display to the second brightness; and
keeping the display at the second brightness until activating the first key of the handheld mobile electronic device.

3. The method of claim 1, wherein before the step of adjusting the display to the second brightness which is less than the first brightness in response to no input signal being received by the display after the first predetermined period, claim 1 further comprising:
activating a user interface of an application; and
assigning the application to the sensor output which is from a G-sensor.

4. The method of claim 3, wherein the step of restoring the display from the second brightness back to the first brightness further comprising:
restoring the user interface of the application on the display without deactivating a screen lock.

5. The method of claim 3, wherein the step of restoring the display from the second brightness back to the first brightness in response to receiving the sensor output generated by the specific movement of the handheld mobile electronic device comprising:
restoring the display from the second brightness back to the first brightness in response to the application receiving an interrupt from the G-sensor, wherein the interrupt is generated by the G-sensor in response to detecting the specific movement of the handheld mobile electronic device.

6. The method of claim 1, wherein the sensor output is only generated by the specific movement, and the specific movement comprises a non-zero vector component toward any direction in the horizontal plane, but the sensor output is not generated in response to any vertical vector component.

7. The method of claim 3, wherein when the application comprises a telephone conversation, the sensor output is generated only by the specific movement which comprises a non-zero vertical vector component, but the sensor output is not generated in response to vector component toward any direction in the horizontal plane.

8. The method of claim 1, wherein the first key is the power key which is used to turn on or off the handheld mobile electronic device.

9. The method of claim 2, wherein the first predetermined period is less than 40 seconds, and the second predetermined period is less than two seconds less than the first predetermined period.

10. The method of claim 3, wherein the step of keeping the display in the second brightness regardless of any movement of the handheld mobile electronic device comprises:
dissociate the application with the sensor output.

11. A handheld mobile electronic device comprising:
a first key;
a sensor for generating an output in response to specific movement of the handheld mobile electronic device;
a display for receiving an input signal; and
a processor electrically coupled to the first key, the sensor, the display, and is configured for:
adjusting the display from having a first brightness to a second brightness which is less than the first brightness in response to no input signal being received by the display after a first predetermined period, restoring the display from the second brightness back to the first brightness in response to receiving a sensor output generated by the specific movement of the handheld mobile electronic device, adjusting the display to the second brightness in response to a first activation of the first key of the handheld mobile electronic device, keeping the display in the second brightness regardless of any movement of the handheld mobile electronic device in response to the first activation of the first key, and restoring the display from the second brightness back to the first brightness in response to a second activation of the first key of the handheld mobile electronic device, wherein the second activation of the first key is subsequent to the first activation of the first key.

12. The device of claim 11 further comprising a proximity sensor, and the processor is further configured for:
activating the proximity sensor to detect a nearby object in response to no input signal being received by the display after a second predetermined period, in response to the nearby object being detected and no input signal being received by the display after the first predetermined period, adjusting the display to the second brightness, and keeping the display at the second brightness until activating the first key of the handheld mobile electronic device.

13. The device of claim 11, wherein before the processor is configured for adjusting the display to the second brightness which is less than the first brightness in response to no input signal being received by the display after the first predetermined period, the processor is further configure for:
activating a user interface of an application on the display, and assigning the sensor which is a G-sensor to the application.

14. The device of claim 13, wherein the processor is configured for restoring the display from the second brightness back to the first brightness, the processor is further configured for:
restoring the user interface of the application on the display without deactivating a screen lock.

15. The device of claim 13, wherein the processor is configured for restoring the display from the second brightness back to the first brightness in response to receiving the sensor output generated by the specific movement of the handheld mobile electronic device comprising:
restoring the display from the second brightness back to the first brightness in response to the application receiving an interrupt from the G-sensor, wherein the interrupt is generated by the G-sensor in response to detecting the specific movement of the handheld mobile electronic device.

16. The device of claim 11, wherein the sensor output is generated by the specific movement which comprises a non-zero vector component toward any direction in the horizontal plane, but the sensor output is not generate in response to any vertical vector component.

17. The device of claim 13 further comprising a wireless transceiver for transmitting and receiving a telephone conversation during which the sensor output is generated by the specific movement which comprises a non-zero vertical vector component, but the sensor output is not generated in response to vector component toward any direction in the horizontal plane.

18. The device of claim 11, wherein the first key is the power key which is used to turn on or off the handheld mobile electronic device.

19. The device of claim 12, wherein the first predetermined period is less than 40 seconds, and second predetermined period, and the second predetermined period is less than two seconds less than the first predetermined period.

20. The device of claim 13 further comprising an infrared modulator and an infrared transmitter for transmitting a modulated infrared signal to control a target device.

* * * * *